United States Patent [19]

Minkkinen et al.

[11] Patent Number: 5,735,936
[45] Date of Patent: Apr. 7, 1998

[54] PROCESS AND APPARATUS FOR ELIMINATING AT LEAST ONE ACID GAS BY MEANS OF A SOLVENT FOR THE PURIFICATION OF NATURAL GAS

[75] Inventors: Ari Minkkinen, Saint Nom la Breteche; Joseph Larue, Chambourcy; Pierre Capron, Briey, all of France

[73] Assignee: Institut Francais du Petrole, Rueil-Malmaison, France

[21] Appl. No.: 634,703

[22] Filed: Apr. 18, 1996

[30] Foreign Application Priority Data

Apr. 19, 1995 [FR] France ................ 95 04778

[51] Int. Cl.$^6$ ................ B01D 53/14; B01D 53/22
[52] U.S. Cl. ................ 95/49; 95/51; 95/174; 95/177; 95/181; 95/183; 95/192; 95/193; 95/235; 95/236; 95/4; 55/222; 55/228; 55/268
[58] Field of Search ................ 95/45, 49, 51, 95/149, 171–174, 177, 181, 183, 192, 193, 208, 209, 235, 236; 96/4; 55/222, 228, 233, 267–269

[56] References Cited

U.S. PATENT DOCUMENTS

| | | | |
|---|---|---|---|
| 2,806,552 | 9/1957 | Koble | 95/174 X |
| 3,463,603 | 8/1969 | Freitas et al | 95/177 X |
| 3,534,528 | 10/1970 | Porter | 95/49 |
| 3,910,777 | 10/1975 | Jakob | 95/236 X |
| 4,050,909 | 9/1977 | Ranke | 95/171 X |
| 4,130,403 | 12/1978 | Cooley et al. | 95/49 |
| 4,149,857 | 4/1979 | Volke et al. | 55/40 |
| 4,252,548 | 2/1981 | Markbreiter | 95/236 X |
| 4,430,316 | 2/1984 | Ranke et al. | 95/171 X |
| 4,444,571 | 4/1984 | Matson | 55/16 |
| 4,466,946 | 8/1984 | Goddin, Jr. et al. | 95/51 X |
| 4,478,799 | 10/1984 | Bengeser et al. | 95/172 X |
| 4,529,413 | 7/1985 | Ferguson | 95/166 |
| 4,548,620 | 10/1985 | Albiol | 95/174 |
| 4,589,896 | 5/1986 | Chen et al. | 95/49 X |
| 4,599,096 | 7/1986 | Burr | 95/51 X |
| 4,602,477 | 7/1986 | Lucadamo | 95/51 X |
| 4,606,741 | 8/1986 | Moreau et al. | 95/49 |
| 4,639,257 | 1/1987 | Duckett et al. | 95/51 X |

FOREIGN PATENT DOCUMENTS

| | | |
|---|---|---|
| 0 362 023 | 4/1990 | European Pat. Off. |
| 0 528 709 | 2/1993 | European Pat. Off. |
| 2 479 701 | 10/1981 | France |

*Primary Examiner*—Robert Spitzer
*Attorney, Agent, or Firm*—Millen, White, Zelano, & Branigan, P.C.

[57] ABSTRACT

The process comprises a cold absorption step 2 for removing acid gas from natural gas using a solvent phase at a pressure $P_2$ which delivers a purified gas 5; a step for depressurizing and separating resultant acidic solvent phase containing hydrocarbons (lines 4, 11), at a pressure $P_{12}$ which is lower than pressure $P_2$ in a column-heat exchanger 12 which delivers a purified gaseous effluent 13 overhead and a further solvent phase at the bottom (line 17) which is enriched in hydrogen sulphide; and a solvent phase regeneration step carried out in a distillation column 18 at a pressure $P_{18}$ and no higher than pressure $P_{12}$. A gas 29 containing essentially hydrogen sulphide which is depleted in hydrocarbons is recovered from column 18 and is a suitable feed for a Claus plant for eliminating $H_2S$. The regenerated hot solvent phase 20 indirectly exchanges heat with the cold acidic solvent phase from absorber 2 or separator 6. It is then recycled to the absorbent after cooling.

24 Claims, 1 Drawing Sheet

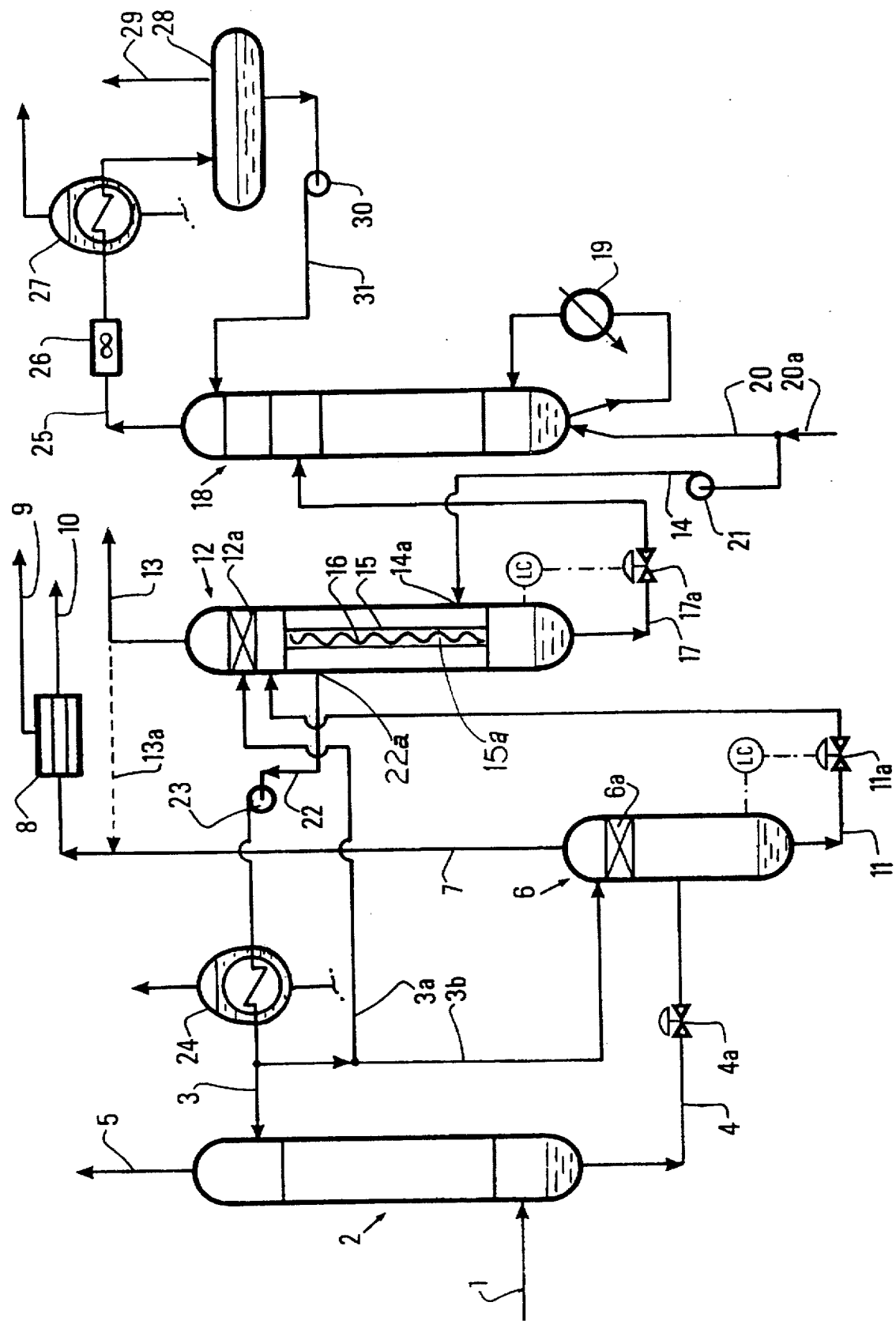

PROCESS AND APPARATUS FOR ELIMINATING AT LEAST ONE ACID GAS BY MEANS OF A SOLVENT FOR THE PURIFICATION OF NATURAL GAS

BACKGROUND OF THE INVENTION

The invention concerns a process for the treatment of a gaseous hydrocarbon feed containing hydrogen sulphide or containing hydrogen sulphide and carbon dioxide. It also concerns an apparatus for carrying out the process.

The process is applicable to hydrotreated gaseous feeds which contain substantially no more carbon dioxide.

The process is particularly applicable to the treatment of natural gas containing a substantial quantity of hydrogen sulphide and carbon dioxide, in particular when a preliminary treatment has eliminated the major portion of the latter. Those acid gases, concentrated during pretreatment, can be re-injected into the well as described in French patent application FR 93/15675.

In order to be able to sell a gas containing less than 3 ppm by volume of hydrogen sulphide, separation techniques must be employed which must be selective towards that poison, since simultaneous elimination of carbon dioxide and hydrogen sulphide does not require the same purity limits, i.e., 2% to 4% by volume of $CO_2$ is tolerated in a gas intended for sale. This can be achieved using a process which employs two steps, one step for partially reducing the acid content using a membrane separation process, followed by a washing scrubbing step for the partially purified gas using a selective amine or solvent. Selective membranes are known to allow diffusion of $H_2S$ and $CO_2$ more easily than the hydrocarbons (in particular methane) contained in natural gas. This apparently simple process has serious drawbacks, in particular when the $H_2S$-rich acid gas is to be re-injected into the reservoir at high pressure.

The principal drawback of pretreatment by membrane permeation resides in the fact that the $H_2S$ and $CO_2$-rich permeate must be recovered downstream of the membrane at a very low pressure in order for the process to be effective. It follows that, if the gas is neither burned nor sent to a sulphur recovery unit, it has to be recompressed to the pressure of the reservoir, leading to high recompression costs and high energy consumption.

A second drawback of the membrane permeation process arises from the fact that the membrane is not perfectly selective for acid gases since a considerable amount of methane can diffuse into the permeate. The loss of marketable methane can be as high as 10% to 15% of the introduced feed.

French patent FR-A-2 605 241, which is hereby incorporated by reference, describes a process for the treatment of a gas containing hydrocarbons, $CO_2$ and $H_2S$ by a solvent which has been cooled, for example methanol in the presence of water. It is based on the principle of the absorption of acid gases by that solvent.

Contact is effected at low temperature in an absorption column and the solvent is then thermally regenerated at low pressure in a regenerator which is a distillation column. Varying the amount of solvent in the absorption column enables a purified gas of the desired specification to be obtained.

However, the solvent co-absorbs a substantial quantity of hydrocarbons and the acid gases liberated after regeneration contain far too much hydrocarbon and $CO_2$ for the gas to be used as a feed for a Claus plant for recovering sulphur and thus for the $H_2S$ to be completely eliminated as elemental sulphur.

Further, the cooling energy required to condense the solvent contained in the overhead effluent from the distillation column (regeneration), which acts as a reflux, is thus much higher. Finally, gas production is observed to fall.

The prior art is also illustrated in European patents EP-A-0 528 709, EP-A-0 362 023, U.S. Pat. No. 4,149,857, French patent FR-A-2 479 701 and U.S. Pat. No. 4,444,571.

SUMMARY OF THE INVENTION

A first aim of the invention is to overcome the drawbacks mentioned above in order to be able to treat the acid gas leaving the cooling column using a Claus plant.

A further aim of the invention is to valorise the acid gas contained in the solvent to the best extent.

We have shown that circulating the solvent phase recovered from the absorber to at least one separation zone at a pressure which is lower than the pressure of the absorber, enables the hydrocarbons to be vaporised and the major portion can be recovered as fuel gas before regenerating the solvent phase.

More precisely, the invention concerns a process for the treatment of a gaseous feed containing a mixture of hydrocarbons, hydrogen sulphide and possibly carbon dioxide, comprising:

a step (a) for contact at a pressure $P_2$ with at least a portion of a recycled polar solvent phase containing at least 50% of a solvent in at least one absorption zone (2), said solvent being a non-hydrocarbon organic solvent which is normally liquid other than water, said solvent being at least partially miscible with water and distillable at a temperature which is lower than that of the distillation of water, to obtain a purified gas containing the major portion of the hydrocarbons and containing substantially no hydrogen sulphide and a first liquid phase comprising the solvent, the remaining hydrocarbons, substantially all the hydrogen sulphide and possibly substantially all the carbon dioxide;

a step (c) for regenerating the solvent phase in at least one distillation column (18); and a step (d) for recycling and cooling the solvent regenerated in the absorption zone (2);

the process being characterized in that:

in a step (b), after step (a), the first liquid phase is depressurized to a pressure $P_{12}$ which is lower than pressure $P_2$ and heated in at least one column-heat exchanger 12 which is vertical or inclined, which indirectly exchanges heat in its internal portion with a counter-current of the heated regenerated solvent phase from step (c) and a second gaseous phase is recovered overhead which contains substantially all the remaining hydrocarbons and the major portion of any carbon dioxide contained in the gaseous feed, and a second heated liquid phase is recovered from the bottom which contains the solvent, the major portion of the hydrogen sulphide and possibly a minor portion of any carbon dioxide;in regeneration step (c), the solvent phase is regenerated by circulating the second liquid phase, after depressurizing if necessary, in a distillation column (18) at a pressure $P_{18}$ which is no greater than pressure $P_{12}$ in the separator-heat exchanger (12), and at least a portion of a third acid gas phase containing the major portion of the hydrogen sulphide and any remaining carbon dioxide is recovered overhead, and the regenerated heated solvent phase is recovered from the bottom; the process being further characterized in that the heated regenerated solvent phase is cooled in the internal portion of the column-heat exchanger and the solvent phase is recovered which is recycled under pressure to the absorption zone (2) after cooling in accordance with step (d).

Regenerating the solvent phase at high temperature after removing the hydrocarbons means that an acid gas is recovered which contains essentially hydrogen which can be eliminated by introducing the gas into a Claus plant for the treatment of sulphur-containing gaseous effluents.

It may be advantageous, before depressurizing and heating step (b) for the first liquid phase containing the solvent, remaining hydrocarbons, substantially all the hydrogen sulphide and substantially all of any carbon dioxide in the feed, to carry out a preliminary depressurization of the first liquid phase to a pressure $P_6$ which is lower than pressure $P_2$ in the absorption zone in at least one intermediate separator (6) from which an intermediate gaseous phase termed the flash gas is recovered overhead, comprising essentially hydrocarbons, a minor quantity of hydrogen sulphide and possibly carbon dioxide, and a liquid phase is recovered from the bottom which contains the solvent, the major portion of any carbon dioxide and substantially all the hydrogen sulphide which is treated in accordance with step (b).

The preliminary depressurization step is generally a simple depressurization carried out, for example, using a weir valve or a depressurizing turbine in a conventional intermediate separator, from which a gaseous fraction which is practically dry (flash gas), containing 50% by weight of hydrocarbons with respect to said fraction, for example, is recovered. The quality of the fuel gas is good.

Either the gaseous phase from the column-exchanger or the flash gas or a mixture of the two is advantageously circulated to a membrane separator to recover a retentate which is rich in hydrocarbons and contains only traces of hydrogen sulphide and an acidic permeate which is rich in $H_2S$ and possibly $CO_2$ (of the order of a few percent, for example).

In general, depressurization of the first liquid phase, with or without intermediate separation, is carried out using at least one depressurization valve or a depressurization turbine to a pressure at which the quantity of hydrogen sulphide in the gaseous effluent taken overhead from the downstream separator is minimised.

In a first variation, the pressure $P_{12}$ in the column-heat exchanger is no higher than the pressure $P_6$ in the intermediate separator.

In a further variation, it is higher than the pressure $P_6$ in the intermediate separator but remains lower than the pressure $P_2$ in the absorption zone. In this case, a pump must be inserted into the transfer line.

In either of these variations, the pressure of the liquid phase must be either raised or reduced using a pump.

In a further feature of the invention, the pressure $P_6$ in the intermediate separator is advantageously in the range 10 bar to 50 bar, preferably in the range 15 bar to 30 bar.

Advantageous conditions for the column-heat exchanger are as follows:

Pressure ($P_{12}$): 8 to 40 bar, preferably 10 to 20 bar;
Number of theoretical plates: 5 to 15;
Tube and shell or plate heat exchanger.

Advantageous conditions for the distillation column (regeneration) for the solvent phase are as follows:

Pressure ($P_{18}$) lower than pressure $P_{12}$ in the separator-heat exchanger, more particularly lower than 15 bar and preferably in the range 2 bar to 6 bar;
Bottom temperature: 100° C. to 150° C.;
Number of theoretical plates: 10 to 20 plates.

The solvent phase generally contains at least 50%, preferably 70% to 80%, of at least one solvent, the remainder being water. This solvent is generally selected from the group formed by methanol, ethanol, methylpropylether, ethylpropylether, dipropylether, methyltertiobutylether, dimethoxymethane, ethanol, methoxyethanol and propanol. Methanol is the preferred solvent.

The recommended amount of solvent is generally a function of the water content of the solvent and especially of the amount of acid gas. It is advantageously in the range 0.8 to 3.5, which constitutes a good compromise for limiting co-absorption of hydrocarbons and energy consumption.

The gas to be treated is generally introduced into the absorption zone at a pressure of less than 150 bar at a temperature of +10° C. to −100° C. The partial pressure of the hydrogen sulphide and carbon dioxide if it contains any, as for example in natural gas, is higher than 3 bar, preferably more than 10 bar.

To reduce the $H_2S$ content in the intermediate gaseous phase (flash gas) or in the second gaseous phase, a gaseous phase washing step is advantageously carried out using with a portion of the regenerated and cooled solvent phase in a washing zone containing an appropriate packing (shaped elements, for example) located overhead of the intermediate separator or the column-heat exchanger respectively.

BRIEF DESCRIPTION OF THE DRAWING

The FIGURE is a schematic flowsheet of comprehensive embodiment of the invention.

DETAILED DESCRIPTION OF THE DRAWING

The invention also concerns an apparatus for carrying out the process. It comprises, in combination:

at least one absorber (2) containing a packing or plates, for example, a line (1) for supplying a feed to the bottom of the absorber and an evacuation line (4) for a first liquid phase from the bottom of the absorber, an overhead evacuation line (5) for purified feed from the absorber and a line (22) for supplying a solvent phase to the head of the absorber, at least one distillation column (18) for the solvent phase comprising an overhead evacuation line for a gaseous acid phase and at least one recycling means (20, 21) at the bottom and at least one means (24) for cooling the regenerated solvent phase directed towards the absorber (2); the apparatus being characterized in that it comprises:

at least one depressurization means (4a) located in the evacuation line (4) for the first liquid phase upstream of a column-heat exchanger (12) described below;

at least one column-heat exchanger (12) with a double chamber which is substantially vertical or inclined having an upper side inlet connected to the depressurization means (4a), comprising at its interior indirect heat exchange means (16) for cooling a regenerated solvent phase in a first chamber and for heating and separating the first liquid phase in a second chamber, said column-heat exchanger comprising an overhead evacuation line (13) for a second gaseous phase which is enriched in hydrocarbons and a bottom evacuation line (17) for a second liquid phase, said heat exchange means (15) comprising a lower side inlet (14a) allowing hot regenerated solvent into said first chamber and an upper side outlet (22a) allowing cooled regenerated solvent from said first chamber connected to the means (24) for cooling said phase;

the distillation column (18) having an upper supply inlet connected to the evacuation line (17) for the second liquid phase, an upper outlet delivering a third acid phase and a lower outlet delivering the regenerated solvent phase, connected to the side inlet of the heat exchange means.

The heat exchange means in the column—exchanger may be a tube and shell exchanger or an exchanger containing vertical plates forming a network of alternating channels, in which both heat exchange and mass transfer occurs. Heat exchanged between the hot regenerated solvent phase which circulates from bottom to top in the first chamber of the heat exchanger (the shell, for example) and cools, and the solvent phase which is enriched in hydrocarbons and in acid gases which circulates from top to bottom in the second chamber of the heat exchanger (the tubes, for example) and heating up while being brought into contact with a counter-current of the vapour please generated, involves simultaneous mass transfer between these two phases and heat transfer with the regenerated solvent phase circulating in the first chamber.

Natural gas at a temperature of $-20°$ C. at a pressure $P_2=70$ bar, containing methane, a small quantity of ethane and propane, and a substantial quantity of carbon dioxide and hydrogen sulphide, is introduced into the lower portion of an absorber 2 via line 1. This absorber contains a packing of shaped elements formed, for example from a gauze, knit or a sheet metal which may be perforated, corresponding to 5 to 20 theoretical plates.

The natural gas is washed in a counter-current of recycled and cooled solvent phase containing 70% of methanol and 30% of water which is introduced via line 3 into the upper portion of the absorber. All the hydrogen sulphide, the major portion of the carbon dioxide and a small quantity of the hydrocarbons are absorbed by the cold liquid stream due to their solubilities in the solvent solution under the conditions in the absorber.

A purified hydrocarbon gas is recovered overhead from the absorber via line 5, substantially at the same temperature and at the same pressure as at the natural gas inlet and which contains less than 3 ppm by volume of $H_2S$ and a predetermined quantity of $CO_2$, in general less than 2% by volume.

A line 4 at the lower extremity of the absorber recovers a first liquid phase comprising the solvent, the acid gases and remaining hydrocarbons at a temperature which is substantially higher than that at the inlet and introduces it to the inlet of an intermediate separator 6 (flash drum) after the liquid phase has been depressurized to a pressure $P_6$ by means of a weir valve 4a upstream of the separator, resulting in a drop in the temperature of the solution by several degrees, for example 5° C. A gas washing section 6a located in the upper portion of separator 6 comprises loose packing elements, for example Pall or Raschig rings, over which circulates a portion of the regenerated and cooled solvent phase introduced via line 3b connected to recycling line 3.

A cold gaseous phase, the flash gas, is recovered overhead of separator 6 via a line 7 at a pressure of about 20 to 30 bar. It can be purified in at least one membrane permeation separation module 8, Medal type (Air Liquide, France) from which a permeate which is rich in $H_2S$ and $CO_2$ can be recovered at a lower pressure via line 9 and a hydrocarbon-rich retentate can be recovered via a line 10. The acid gas can be combined with the final acid effluent which will be introduced into a Claus plant for the treatment of sulphur-containing effluents. In contrast, the hydrocarbon stream can be recovered at a pressure which is substantially the same as that in the intermediate separator (6) and used as a fuel gas.

The gaseous phase leaving separator (6) via line 7 can also be recompressed and remixed with the gas stream circulating in line 1.

From the bottom of the intermediate separator a cold liquid phase, at $-20°$ C. for example, is recovered which is depressurized by means of a weir valve 11a, and sent to the upper portion of a double-chamber column—heat exchanger 12 which is substantially vertical at a sufficiently high pressure $P_{12}$ to liberate an acid gas stream which is rich in $CO_2$ and remaining hydrocarbons and prevents the liberation of $H_2S$ from the stream.

The head of the column—exchanger comprises a washing section 12a which is identical to that of the intermediate separator. A portion of the cooled regenerated solvent phase is introduced above this section via line 3a, the cold liquid phase is introduced below the washing section.

The central portion of the column—exchanger comprises an indirect heat exchange section 16 with a shell, at the base of which a hot solvent phase, at 100° C., for example, is introduced laterally via line 14 for recycling to absorber 2. This phase exchanges heat with the cold liquid phase which is introduced and circulates in a plurality of tubes 15 which are substantially vertical and parallel. Each tube can be packed with a packing element 15a, for example Hitram, designed to increase heat and mass transfer. A line 22 connected to a pump 23 from an upper side outlet 22a in the shell supplies partially cooled regenerated solvent phase to a cooling heat exchanger 24 connected to the upper portion of absorber 2 via line 3.

The overhead gas stream leaving the column—exchanger via line 13 at a temperature of, for example, $-10°$ C. at 15 bar comprises cold depressurized vapour mixed with vapour from the indirect heating in the tubes themselves of heat exchanger 16; this gas stream is a mixture containing substantially all the remaining hydrocarbons and the major portion of the carbon dioxide, and can be used as a reinjection fluid for enhanced recovery of hydrocarbons.

This mixture can also be introduced via a line 13a into membrane separation module 8 for purification. A line 17 recovered a second heated liquid phase containing solvent, the major portion of the hydrogen sulphide and a minor portion of the carbon dioxide initially present from the bottom of the column-heat exchanger and introduces it into the upper portion of a distillation column 18 via a depressurization valve 17a, to regenerate the solvent phase. This distillation column operates at an inlet pressure $P_{18}$ which is slightly higher than that of a Claus plant and recovers overhead a gaseous effluent from the distillation at a pressure of the order of 2 bar, for example. This overhead gaseous effluent, containing the major portion of the hydrogen sulphide and remaining carbon dioxide and solvent, is evacuated via a line 25 and passes successively through a water- or air-cooled condenser 26 and a cooled condenser 27 before condensing in a condensing chamber 28. A line 31 connected to the base of the chamber and a reflux pump 30 introduce a liquid phase containing solvent into the upper portion of distillation column 18. A dry acid gas stream containing hydrogen sulphide, carbon dioxide and a concentration of less than 2% of hydrocarbons in the gas stream is recovered overhead from chamber 28 via line 29. Thus the gas stream can be treated as a suitable feed for complete elimination of $H_2S$ using the Claus process.

The solvent phase is regenerated by heating the bottom of the column to a suitable temperature, generally below 150° C., using a reboiler 19 using a low level heating fluid such as hot water or the vapour resulting from waste incineration.

The hot regenerated liquid solvent phase is evacuated via a line 20 at the lower portion of distillation column 18 and is sent via recycling pump 21 and line 14 to the lower inlet 14a of shell 16 in the heat exchanger of separator 12. Pure solvent can be added to line 20 via line 20a. The regenerated and partially cooled solvent phase which leaves the shell via outlet 22a and line 22 is then recycled towards absorber 2 via pump 23 and cooling exchanger 24, via line 3.

The invention will be better understood from the following example which illustrates a preferred embodiment. The reference numerals are those of the FIGURE.

A cold acid gas at –23° C. and 52.3 bars absolute with the composition given below (Table I) was introduced into absorber 2 and brought into contact with a counter-current of 6884 kmoles of a solution of 85% by weight of methanol in water at the same temperature and pressure.

TABLE I

| Compound | Line 1<br>$10^3$ moles/hour | Line 5<br>$10^3$ moles/hour |
|---|---|---|
| $N_2$ | 175.0 | 168.7 |
| $H_2S$ | 54.0 | 0.0 |
| $CO_2$ | 1242.0 | 33.0 |
| $CH_4$ | 1465.0 | 1337.4 |
| $C_2H_6$ | 183.0 | 124.5 |
| $C_3H_8$ | 3.5 | 0.9 |
| Total | 3122.5 | 1664.5 |

The purified gas (line 5) had the composition shown in Table I. The first solvent-rich liquid phase at a temperature of –6° C. (line 4) was depressurized through a weir valve 4a and introduced absolute into intermediate separator 6 at –8° C. and 30 bars.

The flash gas recovered overhead (line 7) had the composition shown in Table II. The flash gas could be purified through a permeation membrane 8 (type: Medal, for example, sold by Air Liquide), to recover a gaseous effluent (line 10) containing 90% of hydrocarbons which could be used as a fuel gas, and a permeate which was rich in acid gases (line 9) with the compositions shown in Table II.

TABLE II

| Compound | Line 7<br>$10^3$ moles/hour | Line 9<br>$10^3$ moles/hour | Line 10<br>$10^3$ moles/hour |
|---|---|---|---|
| $N_2$ | 4.80 | 0.800 | 4.000 |
| $H_2S$ | 1.00 | 0.996 | 0.004 |
| $CO_2$ | 99.00 | 90.570 | 8.430 |
| $CH_4$ | 71.00 | 8.000 | 63.000 |
| $C_2H_6$ | 13.00 | 0.400 | 12.600 |
| $C_3H_8$ | 0.30 | 0.000 | 0.300 |
| $CH_3OH$ | 0.16 | 0.100 | 0.060 |
| Total | 189.26 | 100.866 | 88.394 |

The liquid phase (line 11) containing the solvent phase and the remaining acid gases at –8° C. and 30 bars absolute was depressurized in a weir valve to 15 bars absolute and introduced to the head of shell and tube column—heat exchanger 12. The resulting overhead effluent was at a temperature of –10° C. at 15 bars absolute (line 13) and had the following composition (Table III).

TABLE III

| Compounds | Line 13<br>$10^3$ moles/hour | Line 29<br>$10^3$ moles/hour |
|---|---|---|
| $N_2$ | 1.30 | 0.2 |
| $H_2S$ | 3.00 | 50.0 |
| $CO_2$ | 1060.00 | 50.0 |
| $CH_4$ | 56.00 | 0.6 |
| $C_2H_6$ | 45.00 | 0.5 |
| $C_3H_8$ | 1.30 | 1.0 |
| $CH_3OH$ | 1.06 | 1.0 |
| Total | 1167.66 | 103.3 |

The liquid phase leaving the column-heat exchanger was recovered (line 17) at about 80° C. at 15 bars absolute and depressurized by means of weir valve 17a to 2 bars absolute before being introduced into distillation column 18. This had a rectifying section of 2 theoretical plates constituted by a shaped packing. The number of theoretical plates in the distillation column was 5.

The $H_2S$-enriched gaseous acidic effluent recovered overhead from the column after cooling and condensing the solvent phase had the composition given in Table III above (line 29). It could be used as a feed for a Claus plant because of its very low hydrocarbon content.

The hot water boiler at the bottom of the column produced a temperature of 100° C. at 2.5 bars absolute. The regenerated solvent contained less than 1 ppm of $H_2S$.

The material balance of this example (line 1 and lines 5, 7, 13 and 29), excluding methanol, indicates the importance of this process.

Finally, it was shown that the energy required to reboil the solvent phase in the distillation column was lower than that required to condense the acid gas phase and thus the process is very economical.

We claim:

1. A process for the treatment of a gaseous feed containing a mixture of hydrocarbons, hydrogen sulphide and optionally containing carbon dioxide, comprising:

a step (a) for contact at a pressure $P_2$ with at least a portion of a recycled polar solvent phase containing at least 50% of a solvent in at least one absorption zone (2), said solvent being a normally liquid non-hydrocarbon organic solvent other than water, said solvent being at least partially miscible with water and distillable at a temperature lower than that of the distillation of water, to obtain a purified gas containing most of the hydrocarbons and containing substantially no hydrogen sulphide, and a first liquid phase comprising the solvent, any remaining hydrocarbons, substantially all the hydrogen sulphide and optionally containing substantially all the carbon dioxide;

a step (c) for thermally regenerating the solvent in at least one distillation column (18); and a step (d) for cooling and recycling resultant regenerated solvent to the absorption zone (2);

the process being characterized in that:

in a step (b), after step (a), the first liquid phase is depressurized to a pressure $P_{12}$ which is lower than pressure $P_2$ and heated in at least one column-heat exchanger 12 which is vertical or inclined, which indirectly exchanges heat in its internal portion with a counter-current of resultant heated regenerated solvent phase from step (c), and a second gaseous phase is recovered overhead which contains substantially all remaining hydrocarbons, a minor portion of hydrogen sulphide and most of any carbon dioxide contained in the gaseous feed; and a second heated liquid phase is recovered from the bottom which contains the solvent, most of the hydrogen sulphide and optionally a minor portion of any carbon dioxide;in regeneration step (c), the solvent phase is regenerated by circulating the second liquid phase, after optionally depressurizing, in the at least one distillation column (18) at a pressure $P_{18}$ which is no greater than the pressure $P_{12}$ in the column-heat exchanger (12), and at least a potion of a third acid gas phase containing the major portion of the hydrogen sulphide and any remaining carbon dioxide is recovered overhead, and the regenerated, heated solvent phase is recovered from the bottom; the process being further characterized in that the heated regenerated solvent phase is cooled in the internal portion of the column-heat exchanger (12) and the solvent phase is recovered which is recycled under pressure to the absorption zone (2) after cooling in accordance with step (d).

2. A process according to claim 1, in which before step (b), preliminary depressurization of the first liquid phase to a pressure $P_6$ which is lower than the pressure $P_2$ in the absorption zone is carried out in at least one intermediate separator (6) from which an intermediate gaseous phase flash gas is recovered overhead, comprising essentially hydrocarbons, a minor quantity of hydrogen sulphide and optionally carbon dioxide, and a liquid phase is recovered from the bottom which contains the solvent, optionally a major portion of any carbon dioxide and substantially all the hydrogen sulphide which is treated in accordance with step (b).

3. A process according to claim 2, in which the pressure $P_{12}$ in the column-heat exchanger is no higher than the pressure $P_6$ in the intermediate separator.

4. A process according to claim 2, in which the pressure $P_{12}$ in the column-heat exchanger (12) is higher than the pressure $P_6$ in the intermediate separator (6).

5. A process according to claim 2 further comprising circulating the flash gas through a permeation membrane separator to recover a permeate which is enriched in hydrogen sulphide and a gaseous retentate which is enriched in hydrocarbons and depleted in hydrogen sulphide.

6. A process according to claim 2, in which the flash gas is washed in a washing step with a portion of the regenerated and cooled solvent phase at the head of the intermediate separator.

7. A process according to claim 2, in which the pressure in the intermediate separator (6) is 10 to 50 bar, the pressure in the column-heat exchanger (12) is 8 to 40 bar and the pressure in the distillation column is in the range 2 bar to 6 bar.

8. A process according to claim 1, in which the pressure $P_{18}$ in the distillation column (18) is lower than the pressure $P_{12}$ in the column-heat exchanger (12).

9. A process according to claim 1, in which the partial pressure of hydrogen sulphide and any carbon dioxide is higher than 3 bar.

10. A process according to claim 9, wherein the partial pressure is higher than 10 bar.

11. A process according to claim 1, in which the first liquid phase from step (a) is depressurized by means of at least one depressurizing valve or turbine to a pressure such that the quantity of hydrogen sulphide in resultant overhead gaseous effluent from the depressurization is minimised.

12. A process according to claim 1, further comprising circulating the second gaseous phase through a permeation membrane separator (8) to recover a permeate which is enriched in hydrogen sulphide and a retentate which is enriched in hydrocarbons and depleted in hydrogen sulphide.

13. A process according to claim 1, in which the second gaseous phase is washed in a washing step with a portion of the regenerated cooled solvent phase in a washing zone located at the head of the column-heat exchanger (12).

14. A process according to claim 1, in which the column-heat exchanger comprises a tube and shell heat exchanger or a plate heat exchanger.

15. A process according to claim 1, in which the gas is introduced into the absorption zone at a pressure of less than 150 bar and at a temperature of +10° C. to −100° C.

16. A process according to claim 1, in which the solvent is selected from the group consisting of methanol, ethanol, methylpropylether, ethylpropylether, dipropylether, methyltertiobutylether, dimethoxymethane, methoxyethanol and propanol.

17. A process according to claim 1, in which the first liquid phase is introduced to a washing zone upstream of the column—heat exchanger (12).

18. An apparatus for the treatment of a gaseous feed containing hydrocarbons, hydrogen sulphide and optionally containing carbon dioxide, comprising at least one absorber (2) containing a packing or plates, a line (1) for supplying a feed to the bottom of the absorber and an evacuation line (4) for a first liquid phase from the bottom of the absorber, an overhead evacuation line (5) for purified feed from the absorber and a line (22) for supplying solvent phase to the head of the absorber, at least one distillation column (18) for the solvent phase comprising an overhead evacuation line for a gaseous acid phase and at least one recycling means (20,21) at the bottom and at least one means (24) for cooling regenerated solvent phase directed towards the absorber (2); the apparatus being characterized in that it comprises:

at least one depressurization means (4a) located in the evacuation line (4) for the first liquid phase upstream of at least one column-heat exchanger (12);

the at least one column-heat exchanger (12) with having a double chamber and being substantially vertical or inclined and having an upper side inlet connected to the depressurization means (4a), said at least one column heat exchanger (12) also comprising at its interior indirect heat exchange means (15) for cooling a regenerated solvent phase in a first chamber and for heating and separating the first liquid phase in a second chamber, said column-heat exchanger comprising an overhead evacuation line (13) for a second gaseous phase which is enriched in hydrocarbons and a bottom evacuation line (17) for a second liquid phase, said indirect heat exchange means (15) comprising a lower side inlet (14a) allowing hot regenerated solvent into said first chamber and an upper side outlet (22a) allowing cooled regenerated solvent from said first chamber to be connected to the means (24) for cooling said phase;

the distillation column (18) having an upper inlet connected to the evacuation line (17) for the second liquid phase, an upper outlet delivering a third acid phase and a lower outlet delivering the regenerated solvent phase, connected to the lower side inlet (14a) of the indirect heat exchange means.

19. An apparatus according to claim 18, in which at least one intermediate separator (6) is interposed between depressurization valve or turbine and the column-heat exchanger (12), said separator (6) comprising an evacuation line (7) for a flash gas and an evacuation line (11) for a liquid phase connected to the upper side inlet of the column-heat exchanger.

20. An apparatus according to claim 19, in which the heat exchange means are a shell and tube exchanger or a plate exchanger.

21. An apparatus according to claim 19, in which the upper portion of the intermediate separator comprises a washing section (6a) and means (3b) for supplying regenerated and cooled solvent phase.

22. An apparatus according to claim 19, in which at least one permeation membrane separator (8) is located in the flash gas evacuation line (7), said separator comprising an evacuation line for a permeate and an evacuation line for a retentate.

23. An apparatus according to claim 18, in which the upper portion of the column-heat exchanger comprises a washing section (12a) and means (3a) for supplying regenerated and cooled solvent phase.

24. An apparatus according to claim 18, in which at least one permeation membrane separator is located in line (13) for evacuating the second gaseous phase, said separator comprising an evacuation line for a permeate and an evacuation line for a retentate.

* * * * *